United States Patent [19]

Yano

[11] 4,411,967
[45] Oct. 25, 1983

[54] CELL GENERATING SYSTEM

[75] Inventor: Masao Yano, Hyogo, Japan

[73] Assignee: Mitsubishi Denki Kabushiki Kaisha, Tokyo, Japan

[21] Appl. No.: 368,517

[22] Filed: Apr. 13, 1982

[51] Int. Cl.³ .............................................. H01M 8/04
[52] U.S. Cl. ...................................... 429/23; 429/61; 429/90; 320/48; 324/76 R
[58] Field of Search ..................... 429/23, 22, 61, 90, 429/92; 320/48, 49; 324/76 R

[56] References Cited

U.S. PATENT DOCUMENTS 3,580,741  5/1971  Hovious et al. ....................... 429/23
4,289,836  9/1981  Lemelson ............................. 429/61

OTHER PUBLICATIONS

Article entitled "Progress in Self-Commutated Inverters for Fuel Cells and Batteries", Phillips et al., IEEE Transactions on Power Apparatus and Systems, vol. PAS-98, No. 4, Jul./Aug. 1979, pp. 1466–1475.

Primary Examiner—Charles F. Lefevour
Attorney, Agent, or Firm—Bernard, Rothwell & Brown

[57]           ABSTRACT

In a generating system including a plurality of parallel-operated fuel cells possessing a plurality of stacks, each of the cells is provided with a control circuit comprising chopper means each composed of switching elements which are ignition-controlled and each of which is connected to the output terminal of the respective cells, and ignition circuits each generating an ignition signal for ignition-controlling the switching elements in such manner that output current of the chopper means is made to be a prescribed value in accordance with the output current, whereby output control is effected in respect of each stack of the fuel cells so that load in respect of the respective cells is equalized and parallel operation with a high efficiency is effectuated.

3 Claims, 6 Drawing Figures

CELL GENERATING SYSTEM

BACKGROUND OF THE INVENTION

1. Field of the Invention

This invention relates to a cell generating system from which electric power of cells generated is derived with a high efficiency.

2. Description of Prior Art

Heretofore a cell generating system as shown in FIG. 1 has been proposed as such type of system as described above. In such a conventional generating system, however, there have been remarkable unbalances among load in respective fuel cells. As a consequence, there has been such a disadvantage in that only such fuel cells possessing similar output characteristics to each other are selected and they must be utilized in parallel connection in order to obtain a required output voltage.

More specifically, FIG. 1 is a connection diagram showing a conventional cell generating system in which natural gas is supplied from a tank 1 for storing the natural gas being a fuel to a hydrogen gas extractor 3 through a pipe 2. On the other hand, water is supplied from a tank 4 for storing the water to the hydrogen gas extractor 3 through a pipe 5. The hydrogen gas extractor 3 extracts hydrogen gas from the natural gas and feeds the resulting hydrogen gas to stacks 6 and 7 of a fuel cell through a valve 111. Besides the hydrogen extractor 3 feeds also the hydrogen gas extracted to stacks 8 and 9 of another fuel cell through a valve 112.

Furthermore air is supplied from an air feeder 12 to the stacks 6–9, inclusive, of these fuel cells through a pipe 13, respectively. Positive and negative wires 14 and 15 are connected with the electrodes of these stacks 6–9, respectively, and a static chopper means 161 for controlling dc voltage is connected to the wire 14.

The chopper means 161 comprises a thyristor 17 the main electrode of which is connected with the wire 14, a capacitor 18, a reactor 19, and a thyristor 20 for controlling commutation being connected in parallel to the thyristor 17 through the capacitor 18 and the reactor 19.

In addition, a smoothing reactor 211 is connected with the wire 14 through the thyristor 17. A converter 22 involving a plurality of thyristors and effecting dc-ac conversion is connected across the reactor 211 and the wire 15. Besides a transformer 24 is connected to the converter 22.

FIG. 2 is a waveform diagram for explaining operation of the generating system shown in FIG. 1. As illustrated in FIG. 1, the stacks 6–9 generate dc electric power by reacting the hydrogen gas supplied from the hydrogen gas extractor 3 with the air fed from the air feeder 12. The resulting dc electric power is supplied to the converter 22 through the chopper means 161 and the reactor 211 thereby converting into ac electric power, and the ac electric power thus converted is supplied to a load (not shown) through the transformer 24.

FIG. 2(a) is a waveform of the ignition signal supplied to a gate of thyristor 17 in the chopper means 161 in which the ignition signal involves pulses each having a period T.

Next, FIG. 2(b) is a waveform of ignition signal in the thyristor 20, and this ignition signal has different phase from that of the thyristor 17, but has the same period T. When the thyristors 17 and 20 are alternately turned on in accordance with such ignition signals (a) and (b) in FIG. 2, the chopper means 161 generates such output voltage as shown in FIG. 2(c), whilst the reactor 211 feeds direct current as shown in FIG. 2(d) to the converter 22. From the operation as mentioned above, it is apparent that the voltage at the output terminal of the reactor 211 can be controlled to a prescribed value by changing periods T of the ignition signals from the thyristors 17 and 20, respectively.

Meanwhile the curves in which the voltage is plotted against the current density ($mA/cm^2$) in a fuel cell indicates that the values in the initial state (represented by means of solid line) fall to 90% (dotted line) the original values, in other words, become inferior 90% thereto after the lapse of 5,000 hours as shown in FIG. 3.

Furthermore FIG. 4 is a graphical representation showing output characteristics of the stacks in FIG. 1 in which line A indicates the output characteristics of the stacks 6 and 7, while line B indicates the output characteristics of the stacks 8 and 9. When line A is compared with line B, it is clear that the stacks 8 and 9 have a more remarkable deterioration due to time aging than that of the stacks 6 and 7, and the curve in which the direct current is plotted against the dc voltage in the stacks 8 and 9 is lower than that of the stacks 6 and 7.

If these stacks 6–9 having different output characteristics as described above are connected in series-parallel to each other, i.e., the parallel operation of them is effected whereby the output of dc voltage to be produced is made to be the same $V_0$, current $I_2$ flowing through the stacks 6 and 7 becomes at least 150% larger than current $I_1$ flowing through the stacks 8 and 9. Thus, the generated energy among the stacks 6–9 becomes remarkably unbalanced, and accordingly amounts of the hydrogen gas and air to be supplied to these stacks must be different from each other in response to the above result, so that whose operating efficiency deteriorates remarkably in this case.

SUMMARY OF THE INVENTION

The present invention contemplates to eliminate the disadvantages of a conventional generating system as mentioned above, and an object of the present invention is to provide a generating system in which a load in respect of each fuel cell can be equalized and parallel operation with a high efficiency can be carried out by such manner that each stack in parallel connection is connected with a chopper means being independently controlled.

PREFERRED EMBODIMENTS OF THE INVENTION

Figure 1:
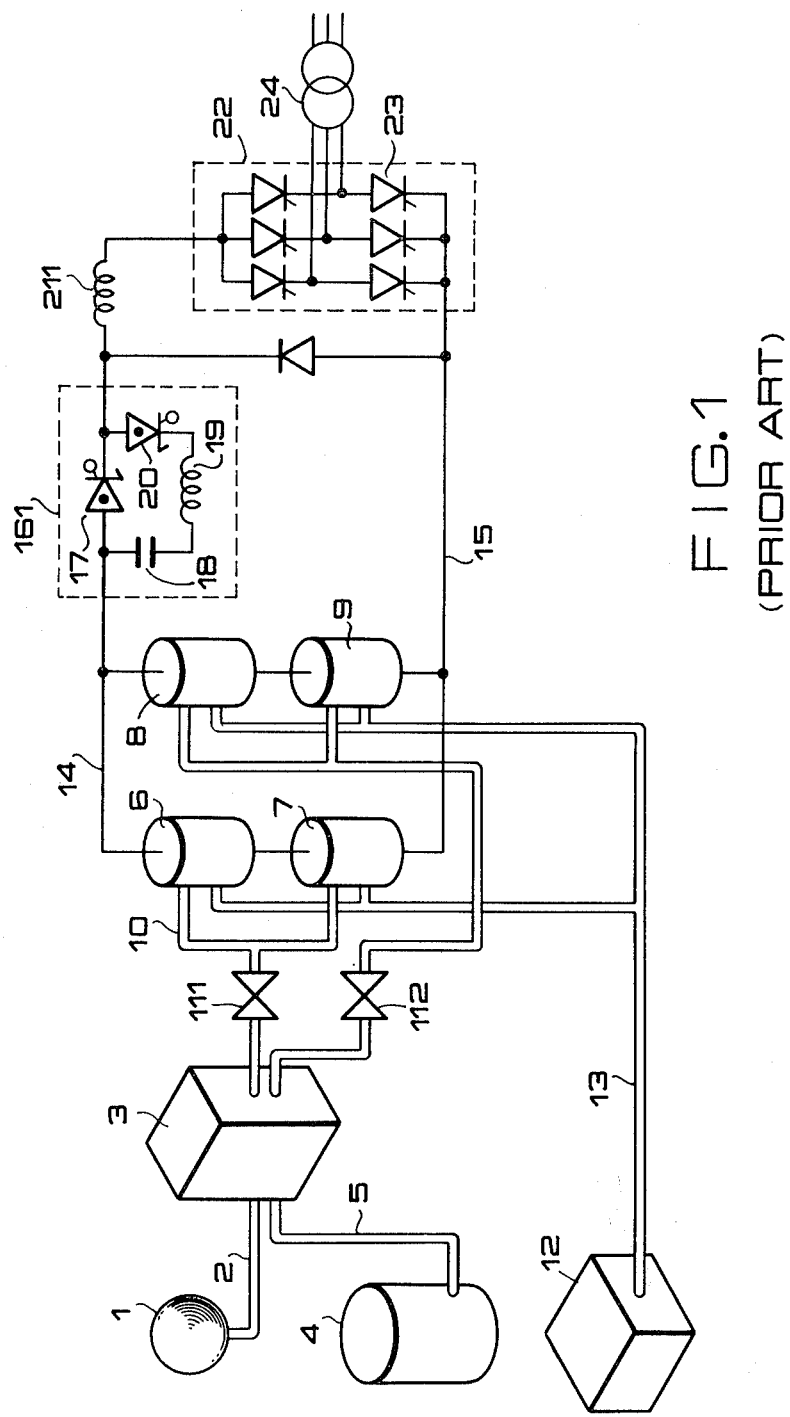
FIG. 1 is a connection diagram showing a conventional cell generating system.
Figure 2:
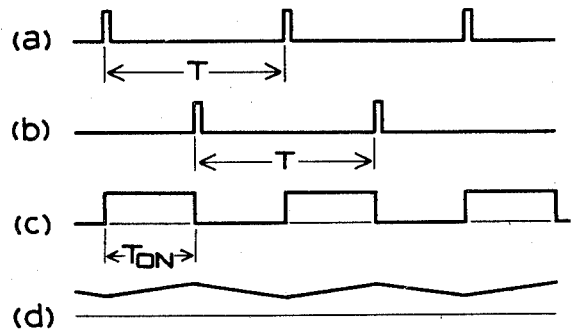
FIG. 2 is a waveform diagram illustrating operation of the system shown in FIG. 1.
Figure 3:
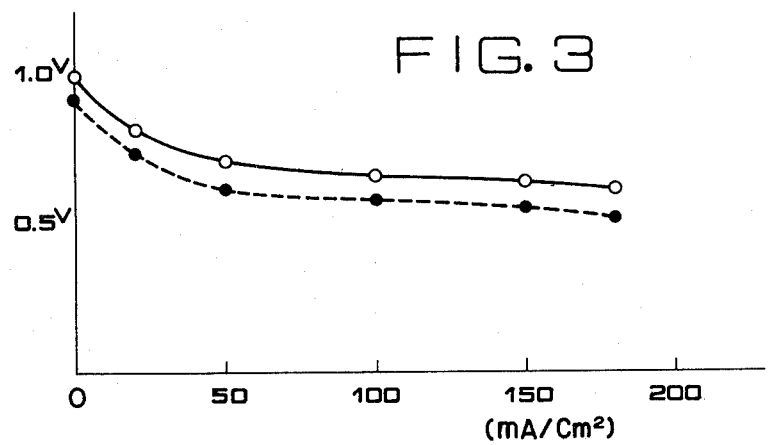
FIG. 3 is a graphical representation showing curves in which the voltage is plotted against the current density in a fuel cell.
Figure 4:
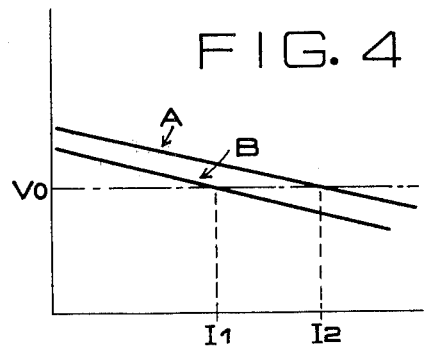
FIG. 4 is a graphical representation showing output characteristics of the stacks in the fuel cells of FIG. 1.
Figure 5:
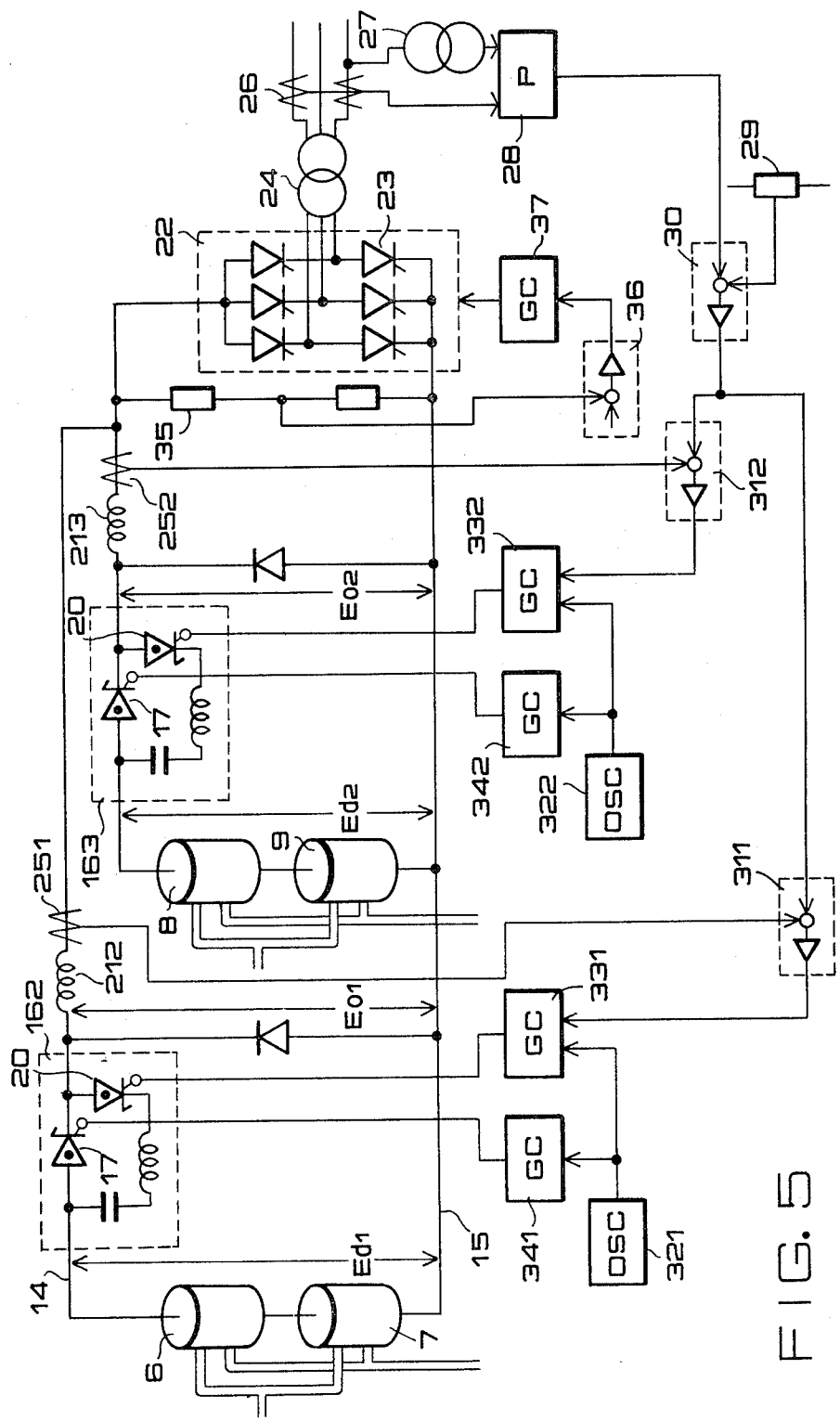
FIG. 5 is a connection diagram showing a cell generating system according to an embodiment of the present invention.

FIG. 5 is a circuit diagram showing a generating system according to an embodiment of the present invention in which the same parts with those in FIG. 1 are designated by the same reference numerals, respectively.

In FIG. 5, first, chopper means 162 and 163 corresponding to stacks 6 and 8 are connected therewith, respectively. Reactors 212 and 213 are connected to output terminals of the chopper means 162 and 163, respectively. Current transformers 251 and 252 for current-transforming output current of these reactors 212 and 213 are connected thereto, respectively. Furthermore, to a transformer 24, a current transformer 26 for current-transforming the output current from the transformer 24 as well as a transformer 27 for voltage-transforming the output voltage from the transformer 24 are connected respectively. In addition, a publicly known measuring circuit 28 for measuring the electrical quantities produced in the current transformer 26 and the transformer 27 is connected therewith, respectively. The output produced by the measuring circuit 28 is transmitted to a detection circuit 30 for detecting a difference between the output of the measuring circuit 28 and that introduced similarly from a setting means 29 comprising a voltage divider. The output from the detection circuit 30 is supplied to a detection circuit 311 together with the output produced in the current transformer 251 to detect the difference between these outputs. On the other hand, both the output from the detection circuit 30 and output from the current transformer 252 are transmitted to a detection circuit 312 to detect the difference between these outputs. Ignition circuits 331 and 332 supply a phase-controlled ignition signal to respective thyristors 20 in the chopper means 162 and 163 in such direction that a deviation between the detection circuits 311 and 312 is minimized in respect of the signals from oscillators 321 and 322 and in accordance with these output signals. On the other hand, ignition circuits 341 and 342 supply an ignition signal to respective thyristors 17 in the chopper means 162 and 163 in accordance with signals from the oscillators 321 and 322.

Furthermore a voltage divider 35 for dividing the voltage at the input terminal of a converter 22 is connected therewith on the input side of the converter. A detection circuit 36 for detecting a deviation between the output from the voltage divider 35 and a set point is connected to the output side of the voltage divider 35. Besides an ignition circuit 37 generating an ignition signal for each thyristor in a converter in such direction that a deviation of the detection circuit 36 is minimized and in accordance with the output from the detection circuit 36 is arranged on the output side thereof.

The operation of the present embodiment will now be fully described hereinbelow.

If it is assumed that:

first, each period of ignition signals in the ignition circuits 341 and 342 is time T having around 400 Hz;

currents flowing through the current transformers 251 and 252 are $I_{d1}$ and $I_{d2}$, respectively;

a resistance of a connecting wire across the chopper means 162 the converter 22 is $R_1$; and a resistance of a connection wire across the chopper means 163 and the converter 22 is $R_2$;

voltages at input terminals of the converter 22 are $E_{do}$; and voltages at input terminals of the chopper means 162 and 163 at the time when ignition signals of the ignition circuits 341 and 342 are delaying by times $T_{ON1}$ and $T_{ON2}$ as compared with those of the ignition circuits 331 and 332, respectively, are $E_{d1}$ and $E_{d2}$, respectively, voltages $E_{01}$ and $E_{02}$ at output terminals of the chopper means 162 and 163 become $E_{d1} \times (T_{ON1}/T)$ and $E_{d2} \times (T_{ON2}/T)$, respectively, so that the following equations (1) and (2) are obtained.

$$E_{d1} \times (T_{ON1}/T) - E_{do} = R_1 \times I_1 \quad (1)$$

$$E_{d2} \times (T_{ON2}/T) - E_{do} = R_2 \times I_2 \quad (2)$$

The above equation (1) determines the current passing through the current transformer 251, while equation (2) determines the current passing through the current transformer 252. However, according to the present invention, even if output voltage characteristics of the stacks 6–9, inclusive, vary due to time aging and the like thereof, it is possible to set currents of the current transformers 251 and 252 to similar values by controlling the times $T_{ON1}$ and $T_{ON2}$, respectively. Such current of the current transformer 251 is controlled by a loop of control circuit comprising the current transformer 251, the detection circuit 311, the ignition circuit 331 and the chopper means 162.

On the other hand, output electric power of the whole system is controlled in such manner that the current transformer 26, the transformer 27, the measuring circuit 28 and the detection circuit 30 are added to the above-mentioned respective loops.

Figure 6:
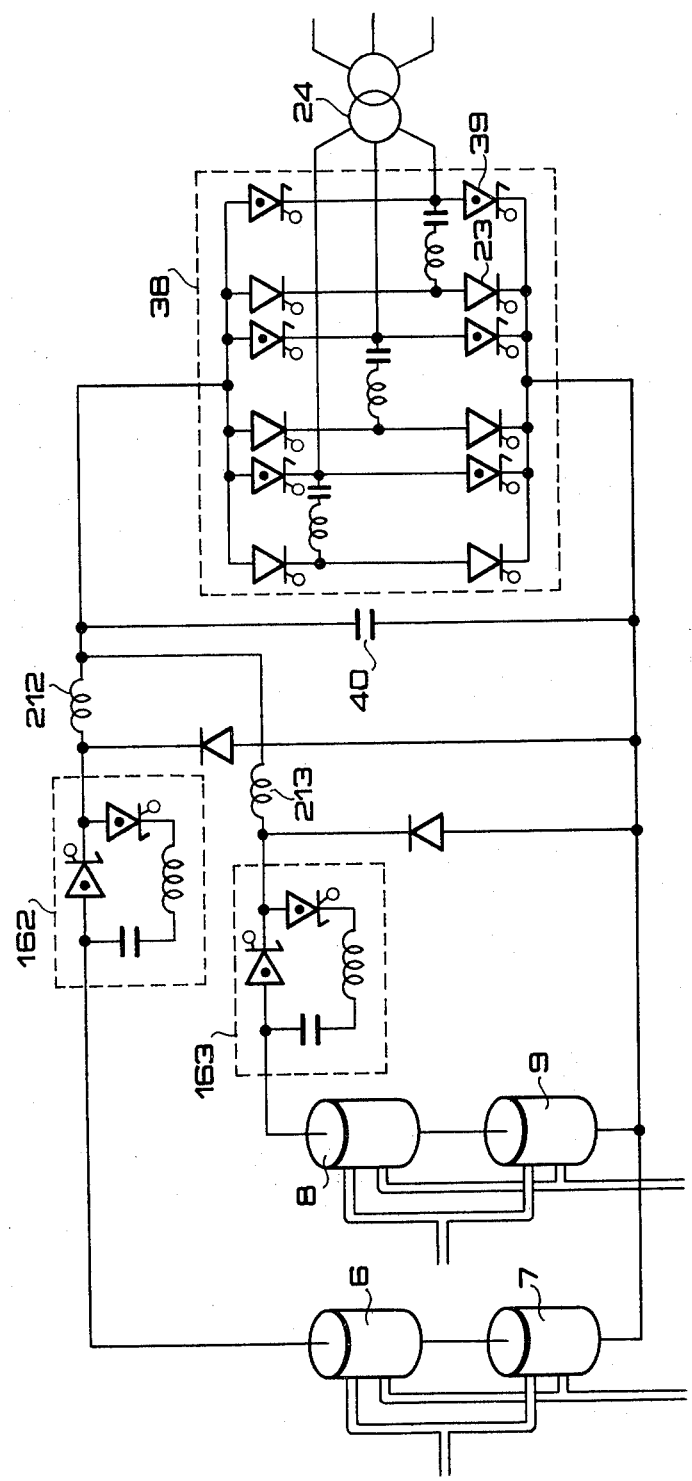
FIG. 6 is a connection diagram showing a cell generating system according to another embodiment of the present invention.

FIG. 6 is a connection diagram illustrating a generating system according to another embodiment of the present invention in which a converter 38 is provided with a thyristor 39 for controlling commutation of a thyristor 23 in order to effect self-exciting operation, and reference numeral 40 designates a capacitor for obtaining smoothing function together with the reactors 212 and 213.

Although two sets of the fuel cell stacks are employed in the above-mentioned embodiments of this invention, three or more sets of such fuel cell stacks may also be utilized.

As described above, the output control is effected in respect of each stack of a fuel cell in the present invention, and accordingly there are such advantages in that load sharing for a fuel cell can be equalized and that a generating system having a favorable efficiency can be established.

What is claimed is:

1. A generating system wherein a plurality of cells are operated in parallel with each other, which comprises each of said plurality of cells being provided with a control circuit including chopper means each composed of switching elements being ignition-controlled and each connected to the output terminal of said respective cells, and ignition circuits each generating an ignition signal for ignition-controlling said switching elements in such manner that output current of said chopper means is made to be a prescribed value in accordance with said output current.

2. A generating system as defined in claim 1 wherein said system is provided with a converter having an input terminal connecting commonly the output terminals of a plurality of said control circuits to each other and converting the dc electric power supplied through said input terminal into ac electric power.

3. A generating system as defined in claim 1 wherein said cells are fuel cells.

* * * * *

UNITED STATES PATENT AND TRADEMARK OFFICE
CERTIFICATE OF CORRECTION

PATENT NO. : 4,411,967
DATED : October 25, 1983
INVENTOR(S) : Masao Yano

It is certified that error appears in the above-identified patent and that said Letters Patent is hereby corrected as shown below:

On the Abstract page, after "[22] Filed: Apr. 13, 1982" insert the following:

--[30]    Foreign Application Priority Data
   Jun. 11, 1981 [JP]  Japan ..................56-91401--

Signed and Sealed this

Fourteenth Day of February 1984

[SEAL]

Attest:

GERALD J. MOSSINGHOFF

Attesting Officer

Commissioner of Patents and Trademarks